United States Patent
Christensen et al.

(10) Patent No.: US 8,296,354 B2
(45) Date of Patent: Oct. 23, 2012

(54) FLEXIBLY TRANSFERRING TYPED APPLICATION DATA

(75) Inventors: Erik Bo Christensen, Seattle, WA (US); Vaithiakingam B. Balayoghan, Bellevue, WA (US); Michael James Coulson, Clyde Hill, WA (US); Ryan Thomas Sturgell, Seattle, WA (US); Natasha Harish Jethanandani, Seattle, WA (US); Michael Jon Marucheck, Bellevue, WA (US); Douglas M. Purdy, Bellevue, WA (US); Kenneth David Wolf, Seattle, WA (US); Michael Steven Vernal, Seattle, WA (US); Stefan Harrington Pharies, Seattle, WA (US); David Wortendyke, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1114 days.

(21) Appl. No.: 11/003,099

(22) Filed: Dec. 3, 2004

(65) Prior Publication Data

US 2006/0123047 A1 Jun. 8, 2006

(51) Int. Cl.
G06F 15/16 (2006.01)
(52) U.S. Cl. ......... 709/203; 709/230; 709/232; 709/205
(58) Field of Classification Search ................... 709/203
See application file for complete search history.

(56) References Cited

U.S. PATENT DOCUMENTS

| | | | |
|---|---|---|---|
| 5,583,859 A | 12/1996 | Feldmeier | |
| 5,774,695 A * | 6/1998 | Autrey et al. | 703/26 |
| 5,838,927 A | 11/1998 | Gillon | |
| 5,923,846 A | 7/1999 | Gage | |
| 6,178,504 B1 | 1/2001 | Fieres | |
| 6,286,033 B1 | 9/2001 | Kishinsky | |
| 6,321,252 B1 | 11/2001 | Bhola | |
| 6,457,066 B1 | 9/2002 | Mein et al. | |
| 6,732,175 B1 | 5/2004 | Abjanic | |
| 6,748,431 B1 | 6/2004 | Fleig | |
| 6,904,600 B1 | 6/2005 | James et al. | |
| 6,907,564 B1 | 6/2005 | Burchhardt et al. | |
| 6,941,306 B2 | 9/2005 | Kim | |
| 7,051,032 B2 | 5/2006 | Chu-Carrol | |
| 7,065,706 B1 | 6/2006 | Sankar | |

(Continued)

FOREIGN PATENT DOCUMENTS

WO WO 02/01356 1/2002

OTHER PUBLICATIONS

Box et al.; XML, SOAP and Binary Data; Feb. 24, 2003; xml.com; 11 pages.*

(Continued)

*Primary Examiner* — Abdullahi Salad
*Assistant Examiner* — Richard G Keehn
(74) *Attorney, Agent, or Firm* — Merchant & Gould PC

(57) ABSTRACT

The present invention extends to using Simple Object Access Protocol ("SOAP") to exchange typed objects, such as, for example, parameters for invoking methods. A computer system accesses typed object parameters corresponding to a typed object. The typed object is annotated with one or more message contract attributes of a message contract model defining a mapping between typed object parameters and corresponding SOAP elements. The computer system utilizes the message contract attributes to map the typed object parameters into a SOAP element and inserts the SOAP element into a SOAP envelope. A receiving computer system accessing the SOAP element and utilizes the message contract attributes to map the SOAP element back into the typed object parameters.

30 Claims, 4 Drawing Sheets

U.S. PATENT DOCUMENTS

| | | |
|---|---|---|
| 7,069,335 B1 | 6/2006 | Layman et al. |
| 7,080,137 B2 | 7/2006 | Brault |
| 7,089,533 B2 | 8/2006 | Vosburgh |
| 7,114,147 B2 | 9/2006 | Ballantyne |
| 7,124,299 B2 | 10/2006 | Dick et al. |
| 7,150,004 B2 * | 12/2006 | Russell et al. ............ 717/118 |
| 7,159,224 B2 | 1/2007 | Sharma et al. |
| 7,165,239 B2 | 1/2007 | Hejisberg |
| 7,188,158 B1 * | 3/2007 | Stanton et al. ............ 709/220 |
| 7,191,186 B1 | 3/2007 | Pullen |
| 7,191,429 B2 | 3/2007 | Brassard |
| 7,213,227 B2 | 5/2007 | Kompalli |
| 7,237,014 B2 | 6/2007 | Drummond, II |
| 7,246,358 B2 | 7/2007 | Chinnici et al. |
| 7,277,719 B2 | 10/2007 | Klassen |
| 7,281,206 B2 | 10/2007 | Schnelle |
| 7,289,498 B2 | 10/2007 | Yu et al. |
| 7,296,226 B2 | 11/2007 | Junkermann |
| 7,302,492 B1 * | 11/2007 | Day ............ 709/238 |
| 7,325,076 B1 | 1/2008 | Morrison |
| 7,328,403 B2 | 2/2008 | Ramarao |
| 7,418,485 B2 | 8/2008 | Payrits |
| 7,426,194 B2 | 9/2008 | Shenfield |
| 7,437,434 B2 | 10/2008 | Zintel |
| 7,448,043 B2 | 11/2008 | Shenfield |
| 7,454,429 B2 | 11/2008 | Rojer |
| 7,458,062 B2 | 11/2008 | Coulthard |
| 7,464,097 B2 | 12/2008 | Goetz et al. |
| 7,483,994 B1 | 1/2009 | Stephens et al. |
| 7,509,651 B2 | 3/2009 | Catania et al. |
| 7,512,691 B2 | 3/2009 | Sohda et al. |
| 7,512,953 B1 | 3/2009 | Sabev |
| 7,512,957 B2 | 3/2009 | Cohen |
| 7,516,198 B1 | 4/2009 | Appala et al. |
| 7,519,574 B2 | 4/2009 | Van Der Linden |
| 7,533,264 B2 | 5/2009 | Ballinger |
| 7,536,711 B2 | 5/2009 | Miyashita et al. |
| 7,539,982 B2 | 5/2009 | Stuart |
| 7,571,426 B2 | 8/2009 | Carroll |
| 7,603,658 B2 | 10/2009 | Subramanian |
| 7,631,314 B2 | 12/2009 | Joseph et al. |
| 7,644,066 B2 | 1/2010 | Krishnaprasad |
| 7,694,284 B2 | 4/2010 | Berg |
| 7,949,720 B2 | 5/2011 | Vernal et al. |
| 2001/0049702 A1 | 12/2001 | Najmi |
| 2002/0032790 A1 | 3/2002 | Linderman |
| 2002/0046239 A1 | 4/2002 | Stawikowski |
| 2002/0046304 A1 | 4/2002 | Fabri et al. |
| 2002/0062451 A1 | 5/2002 | Scheidt |
| 2002/0124113 A1 * | 9/2002 | Gargya et al. ............ 709/246 |
| 2002/0156871 A1 | 10/2002 | Munarriz et al. |
| 2002/0174340 A1 | 11/2002 | Dick et al. |
| 2003/0005181 A1 * | 1/2003 | Bau et al. ............ 709/330 |
| 2003/0009572 A1 | 1/2003 | Thurner |
| 2003/0051008 A1 | 3/2003 | Gorthy |
| 2003/0061405 A1 | 3/2003 | Fisher |
| 2003/0069907 A1 | 4/2003 | Moreau |
| 2003/0074648 A1 | 4/2003 | Brassard |
| 2003/0093551 A1 | 5/2003 | Taylor et al. |
| 2003/0105654 A1 | 6/2003 | Macleod et al. |
| 2003/0144849 A1 * | 7/2003 | Kakivaya et al. ............ 705/1 |
| 2003/0145101 A1 | 7/2003 | Mitchell |
| 2003/0149781 A1 | 8/2003 | Yared |
| 2003/0172196 A1 * | 9/2003 | Hejlsberg et al. ............ 709/328 |
| 2003/0188156 A1 | 10/2003 | Yasala |
| 2003/0204645 A1 * | 10/2003 | Sharma et al. ............ 709/328 |
| 2003/0204721 A1 | 10/2003 | Barrus |
| 2003/0217096 A1 | 11/2003 | McKelvie et al. |
| 2004/0030947 A1 * | 2/2004 | Aghili et al. ............ 714/1 |
| 2004/0039964 A1 * | 2/2004 | Russell et al. ............ 714/25 |
| 2004/0044729 A1 | 3/2004 | Foerg |
| 2004/0044985 A1 | 3/2004 | Kompalli |
| 2004/0045005 A1 | 3/2004 | Karakashian |
| 2004/0054628 A1 | 3/2004 | de Jong |
| 2004/0068586 A1 | 4/2004 | Xie et al. |
| 2004/0088395 A1 | 5/2004 | O'Konski et al. |
| 2004/0111474 A1 | 6/2004 | Kaler |
| 2004/0148612 A1 | 7/2004 | Olsen |
| 2004/0193635 A1 | 9/2004 | Hsu |
| 2004/0193687 A1 | 9/2004 | Christensen |
| 2004/0194111 A1 | 9/2004 | Marcey |
| 2004/0205216 A1 | 10/2004 | Ballinger |
| 2004/0267876 A1 | 12/2004 | Kakivaya et al. |
| 2005/0021475 A1 | 1/2005 | Imamura et al. |
| 2005/0038708 A1 * | 2/2005 | Wu ............ 705/26 |
| 2005/0050549 A1 * | 3/2005 | Joseph et al. ............ 719/313 |
| 2005/0055345 A1 | 3/2005 | Ripley |
| 2005/0055629 A1 | 3/2005 | Khaladkar |
| 2005/0060431 A1 | 3/2005 | Lewontin |
| 2005/0086594 A1 * | 4/2005 | Schlimmer et al. ............ 715/515 |
| 2005/0091231 A1 | 4/2005 | Pal |
| 2005/0097545 A1 | 5/2005 | Tarbox |
| 2005/0138013 A1 * | 6/2005 | Walker et al. ............ 707/3 |
| 2005/0144457 A1 | 6/2005 | Lee |
| 2005/0172196 A1 * | 8/2005 | Osecky et al. ............ 714/746 |
| 2005/0182752 A1 | 8/2005 | Rojer |
| 2005/0193291 A1 | 9/2005 | Subramanian |
| 2005/0198154 A1 | 9/2005 | Xie et al. |
| 2005/0223392 A1 * | 10/2005 | Cox et al. ............ 719/328 |
| 2005/0228787 A1 | 10/2005 | Linden |
| 2005/0228863 A1 * | 10/2005 | Palmeri et al. ............ 709/205 |
| 2005/0240555 A1 | 10/2005 | Wilde |
| 2005/0257193 A1 | 11/2005 | Falk |
| 2005/0262049 A1 | 11/2005 | Somppi |
| 2005/0278358 A1 | 12/2005 | Doughan |
| 2006/0004827 A1 | 1/2006 | Stuart |
| 2006/0015353 A1 * | 1/2006 | Reese ............ 705/1 |
| 2006/0015847 A1 | 1/2006 | Carroll |
| 2006/0026552 A1 * | 2/2006 | Mazzitelli et al. ............ 717/101 |
| 2006/0036754 A1 | 2/2006 | Itoh et al. |
| 2006/0041579 A1 | 2/2006 | Miyashita et al. |
| 2006/0041838 A1 | 2/2006 | Khan |
| 2006/0064667 A1 | 3/2006 | Freitas |
| 2006/0075117 A1 | 4/2006 | Sohda et al. |
| 2006/0123039 A1 | 6/2006 | Scheuerle |
| 2006/0129971 A1 | 6/2006 | Rojer |
| 2006/0130058 A1 | 6/2006 | Tarbox |
| 2006/0168511 A1 | 7/2006 | Bauer |
| 2006/0200756 A1 * | 9/2006 | Politi et al. ............ 715/513 |
| 2006/0221966 A1 | 10/2006 | Basso et al. |
| 2006/0265689 A1 | 11/2006 | Kuznetsov et al. |
| 2007/0067492 A1 | 3/2007 | Muraki et al. |
| 2007/0073753 A1 | 3/2007 | Baikov |
| 2007/0073760 A1 | 3/2007 | Baikov |
| 2007/0098018 A1 | 5/2007 | Kaler et al. |
| 2007/0121585 A1 | 5/2007 | Morrissey |
| 2007/0124725 A1 | 5/2007 | Wang et al. |
| 2007/0130155 A1 | 6/2007 | Alperin et al. |
| 2007/0133763 A1 | 6/2007 | D'Angelo et al. |
| 2007/0143331 A1 | 6/2007 | Holtz |
| 2007/0143393 A1 | 6/2007 | Brunswig et al. |
| 2007/0156872 A1 | 7/2007 | Stoyanova |
| 2007/0174288 A1 | 7/2007 | Stoyanova |
| 2007/0174763 A1 | 7/2007 | Chang |
| 2008/0010629 A1 | 1/2008 | Berg |
| 2008/0278740 A1 | 11/2008 | Bird et al. |
| 2008/0313282 A1 | 12/2008 | Warila et al. |

OTHER PUBLICATIONS

Simon St. Laurent; SOAP Message Transmission Optimization Mechanism; Jul. 22, 2003; oxygenxml.com; 2 pages.*

XML-binary Optimized Packaging; Feb. 9, 2004; W3C; 11 pages.*

Obermeyer, Piet, et al. "Object Serialization in the .NET Framework" Aug. 2001, Retrieved from the Internet: URL::http://msdn.microsoft.com/library/default.asp?url=/library/en-us/dndotnet/html/objserializ.asp> retrieved on Jun. 17, 2005.

TOPXML: "Processing SOAP Messages with the SoapFormatter" TOPXL Tutorial, Mar. 2, 2004; Retrieved from the Internet: URL:htpww.topxml.com/soapformatter/soapformatter.pdf> retrieved on Mar. 17, 2006.

Beauchemin, Bob "Essential ADO.NET: XML and Data Access Integration" Addison Wesley Professional, Nov. 1, 2002; Retrieved from the Internet: URL:http://www.awprofessional.com/articles/printerfriendly.asp?P=29901.

Gudgin, Martin, et al. "SOAP Message Transmission Optimization Mechanism" W3C Proposed Recommendation, Nov. 16, 2004, Retrieved from the Internet: URL:http://www.w3.org/TR/2004/PR-soap12-Mtom-20041116/>.

Gudgin, Martin, et al. "XML—binary Optimized Packaging" W3C Proposed Recommendation, Nov. 16, 2004, Retrieved from the Internet: URL:http://www.w3.org/TR/2004/PR-xop10-20041116/>.

Mischkinsky, Jeff, et al. "Simple CORBA Object Access Protocol (SCOAP): A Discussion Paper—Presentation Slides" On-Line Presentation, Sep. 18, 2000.

Gitman, Mitch, "Axis-orizing object for SOAP" JavaWorld, Apr. 11, 2003, Retrieved from the Internet: URL:http://www.javaworld.com/javaworld/jw-04-2003/jw-0411-axis_p.html>.

Japanese Patent Office Final Notice of Rejection cited in Application No. 2005-332027, dated Jan. 27, 2012 (in Japanese with English translation); 5 pages.

Web Services Metadata for the Java™ Platform, Version 0.9 Sep. 2, 2004, Copyright 2002, 2003, 2004 BEA Systems, Inc.; 45 pages.

"Microsoft Announces Web Services Development Kit Technology Preview", Aug. 26, 2002, Available at http://xml.covelPages.org/nl2002.,Q8-26-c.html, 4 pages.

Bosworth, Adam, "XML, SOAP and Binary Data", 2003 BEA Systems, Microsoft Corporation, obtained online Jan. 25, 2010, 4 pgs.

De Lancie, Phillip, "Streaming Media Matures", Econtent, Aug. 2002, Col. 25, No. 8, pp. 22-23, 26-29.

Duftler et al., "Web Services Invocation Framework (WSIF)," IBM T.J. Watson Research Center, Aug. 9, 2001, available at http://www.extreme.indiana.

European Communication in EP application 5110545.0, mailed Dec. 21, 2006, 4 pgs.

European Communication in EP application 5110545.0, mailed Jun. 6, 2007, 4 pgs.

European Notice of Allowance in EP application 5110545.0, mailed Apr. 29, 2011, 6 pgs.

European Search Report in EP application 5110545.0, mailed Apr. 3, 2006, 6 pgs.

Frank Cohen, "Discover SOAP Encoding's Impact on Web Service Performance," available at http://www-128.ibm.comJdeveloperworksfflbrary/ws-soapencl (enclosed entitled "Article 1," 6 pgs.), Mar. 1, 2003.

Gailey, Jeannie Hall; "DIME—Sending Files, Attachments and SOAP Messages Via Direct Internet Message Encapsulation," MSDN Magazine, Dec. 2002, vol. 17, No. 12, pp. 54-60.

Hoff, Dianne et al., Anytime, Anywhere: The Power of Video Streaming: Teaching and Learning in a Network World, TechEd 2000 Proceedings, Mar. 6-9, 2000, pp. 87-92.

Kent et al., IP Encapsulating Security Payload (ESP), Nov. 1998, Network Working Group, RFC 2406.

Lee et al., "An Architecture Model for Dynamically Converting Components into Web Services," IEEE Computer Society, Proceedings of the 11th Asia-Pacific Software Engineering Conference, available at http://ieeexplore.ieee.org/iel5f9444/29994f01371982.pdf?isNumber= (enclosed entitled Article 3, 7 pgs.), 2004.

Li et at, "XML Protocol SOAP Envelope and Encoding," Institute of Information Science and Technology, Ningbo University, available at http://unpan1.un.org/intradoc/groups/pubJicfdocuments/un/unpan001227.pdf, (enclosed entitled "Article 2," 8 pgs.), 2001.

Nielsen, Henirk Frystyk; Christensen, Erik; and Farrell, Joel; "WS Attachments", <http://ietf.org/internet-drcifts/draft-nielsen-dime-soap-01.txt> visited Mar. 19, 2003.

Nielsen, Henrik Frystyk; Sanders, Henery; Sutek, Russell; and Nash, Simon; "Direct Internet Message Encapsulation (DIME)", <http://ietf.org/internet-drafts/draft-nielsen-dinme-02.txt, visited Mar. 19, 2003.

Nielsen, Henrik and Ruellan, Herve; "SOAP1.2 Attacherrtent Feature W3C Working Draft", Sep. 24, 2002, W3C, pp. 1-10.

Powell, Matt; "Understanding DIME and WS-Attachments" <http://msdn.microsoft.com/library/wn-us/dnwebsrvlhtml/DIMEWSattach.asp?frmae=true>, visited Mar. 19, 2003.

Taft, Darryl K. , "Microsoft Previews Web Services Kit," eWeek.com, Aug. 26, 2002, available at http://www.eweek. com/article210,3959,486118,00. asp, 3 Pages.

Towards the Integration of Web Services Security on Enterprise Environments Yuichi Nakamur, Satoshi Hada & Ryo Neyama IBM Research, Tokyo Research Laboratory 2002 IEEE p. 166 to 175.

U.S. Appl. No. 11/469,430, Amendment and Response filed Jan. 14, 2010, 9 pgs.

U.S. Appl. No. 11/469,430, Amendment and Response filed Dec. 14, 2010, 9 pgs.

U.S. Appl. No. 11/469,430, Amendment and Response filed Mar. 20, 2009, 10 pgs.

U.S. Appl. No. 11/469,430, Amendment and Response filed Jul. 1, 2010, 10 pgs.

U.S. Appl. No. 11/469,430, Amendment and Response filed Aug. 24, 2009, 10 pgs.

U.S. Appl. No. 11/469,430, Final Office Action mailed Apr. 1, 2010, 11 pgs.

U.S. Appl. No. 11/469,430, Final Office Action mailed May 22, 2009, 13 pgs.

U.S. Appl. No. 11/469,430, Notice of Allowance mailed Feb. 14, 2010, 13 pgs.

U.S. Appl. No. 11/469,430, Office Action mailed Oct. 14, 2009, 10 pgs.

U.S. Appl. No. 11/469,430, Office Action mailed Dec. 22, 2008, 8 pgs.

U.S. Appl. No. 11/469,430, Office Action mailed Sep. 14, 2010, 21 pgs.

Korean Preliminary Notice of Rejection in Application 10-2005-0096867, mailed May 21, 2012, 1 pg.

* cited by examiner

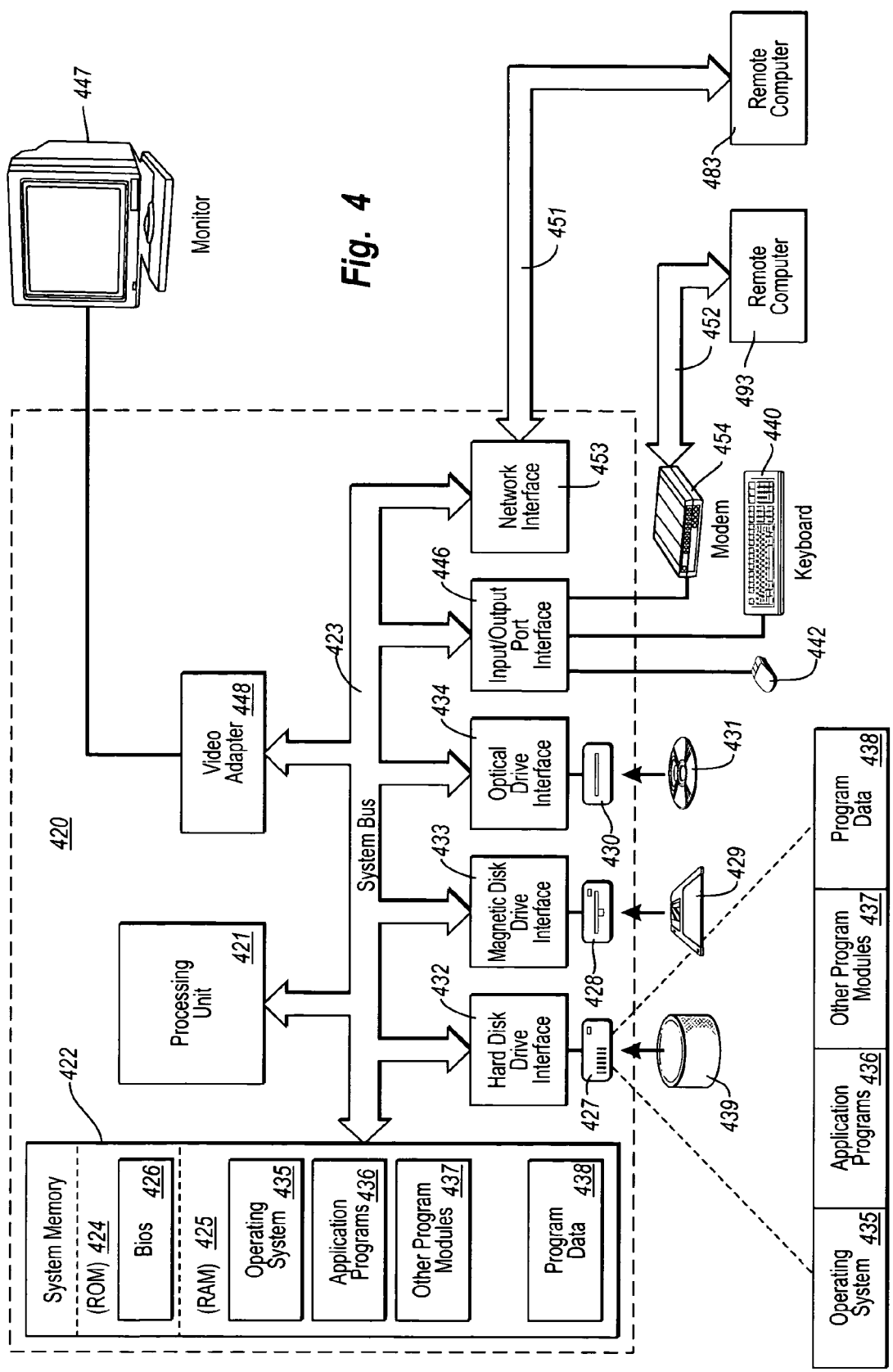

FLEXIBLY TRANSFERRING TYPED APPLICATION DATA

CROSS-REFERENCE TO RELATED APPLICATIONS

Not applicable.

BACKGROUND OF THE INVENTION

1. The Field of the Invention

The present invention relates to electronic messaging and, more particularly, to flexibly transferring typed application data.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the exchange of electronic messages between a number of computer systems and/or other electronic devices via wired and/or wireless computer networks.

Networks have in fact become so prolific that a simple network-enabled computing system may communicate with any one of millions of other computing systems spread throughout the globe over a conglomeration of networks often referred to as the "Internet". Such computing systems may include desktop, laptop, or tablet personal computers; Personal Digital Assistants (PDAs); telephones; or any other computer or device capable of communicating over a digital network.

In order to communicate over a network, one computing system (referred to herein as a "sending computing system") constructs or otherwise accesses an electronic message and transmits the electronic message over a network to another computing system (referred to herein as a "receiving computing system"). The electronic message may be read by a human user as when the electronic message is an e-mail or instant message, or may be read, instead, by an application running on the receiving computing system. The electronic message may be constructed by an application running on the sending computing system with the possible assistance of a human user.

Thus in some environments, messages are exchanged between distributed applications with little, if any, direct user interaction. One protocol used for exchanging messages between distributed applications (e.g., Web services) is the Simple Object Access Protocol ("SOAP"). SOAP is a lightweight protocol intended for exchanging information in a decentralized, distributed environment. SOAP uses eXtensible Markup Language ("XML") technologies to define an extensible messaging framework providing message constructs that can be exchanged over a variety of underlying protocols, such as, for example, Simple Mail Transfer Protocol ("SMTP"), HyperText Transfer Protocol ("HTTP"), User Datagram Protocol ("UDP"), Transmission Control Protocol ("TCP"), and named pipes. SOAP messages can be defined in an open-ended matter as a SOAP infoset (e.g., XML elements) having a set of message headers and a message body.

Many applications are designed using method and/or object-oriented programming models. These programming models frequently use type data formats (e.g., integer, string, logical, or user-defined data formats) to exchange objects between modules. For example, a method can receive one or more typed objects (e.g., parameters of various different data type formats) as input. In response, the method can generate and output (potentially different) values for the typed objects or can return a typed object of a different data type (e.g., the data type of the method). The use of typed data formats is advantageous since it allows a developer to design applications and modules using data types that are more appropriate and/or more efficient based on application and/or module functionality.

Thus in distributed application environments, it may be that typed objects are to be exchanged between different portions of a distributed application. For example, to facilitate a banking transaction, a distributed banking client can exchange a typed banking transaction data structure with a distributed banking server. However, it can be difficult to design distributed applications that utilize the advantages of typed data formats along with the flexibility of SOAP messages.

SOAP is an open-ended protocol and thus places virtually no requirements on mapping application and/or user data into a SOAP message and vice versa. Thus, there are limited, if any, mechanisms for mapping typed objects (e.g., Common Language Runtime ("CLR") types) to corresponding SOAP messages and for mapping SOAP messages to corresponding typed objects. An inability to meaningfully map between typed objects and SOAP messages can make it more difficult, or even impossible, for distributed applications to exchange application and/or user data.

Further, typical mechanisms for encoding SOAP messages into raw octets limit the size of SOAP messages and limit the types of encoders that can be used. Therefore systems, methods, and computer program products for flexibly transferring typed application data would be advantageous.

BRIEF SUMMARY OF THE INVENTION

The foregoing problems with the prior state of the art are overcome by the principles of the present invention, which are directed towards methods, systems, and computer program products for flexibly transferring typed application data. In some embodiments, a computer system configures a SOAP message to transmit typed data. Application code (e.g., a client proxy) calls a typed object (e.g., a method) with typed object parameters (e.g., parameters to a method invocation). The computer system accesses the typed object parameters corresponding to the typed object. The typed object is annotated with one or one more message contract attributes of a message contract model. The one or more message contract attributes define a mapping between typed object parameters and corresponding SOAP elements.

The computer system maps the accessed typed object parameters into SOAP elements in accordance with the one or more message contract attributes. The computer system refers to the one or more message contract attributes to identify a location (e.g., a message header or message body) within a SOAP envelope. The computer system inserts the SOAP element into the identified location within the SOAP envelope. The SOAP envelope can then be placed in a channel, encoded into corresponding raw octets, and the corresponding raw octets transferred to another computer system.

In other embodiments, a computer system retrieves typed data from a SOAP message. The computer system can receive raw octets from another computer system, decode the raw octets into a corresponding SOAP envelope, and place the SOAP envelope in a channel. The computer system accesses a SOAP element included in the SOAP envelope.

The computer system identifies a typed object that corresponds to the SOAP element. The typed object is annotated with one or more message contract attributes of a message contract model. The one or more message contract attributes define a mapping between SOAP elements and corresponding typed object parameters. The computer system maps the accessed SOAP element into typed object parameters in accordance with the one or more message contract attributes. The typed object parameters are submitted to application code (e.g., a service) that includes the identified typed object.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 4 illustrates a suitable operating environment for the principles of the present invention.

DETAILED DESCRIPTION OF THE PREFERRED EMBODIMENTS

Figure 1:
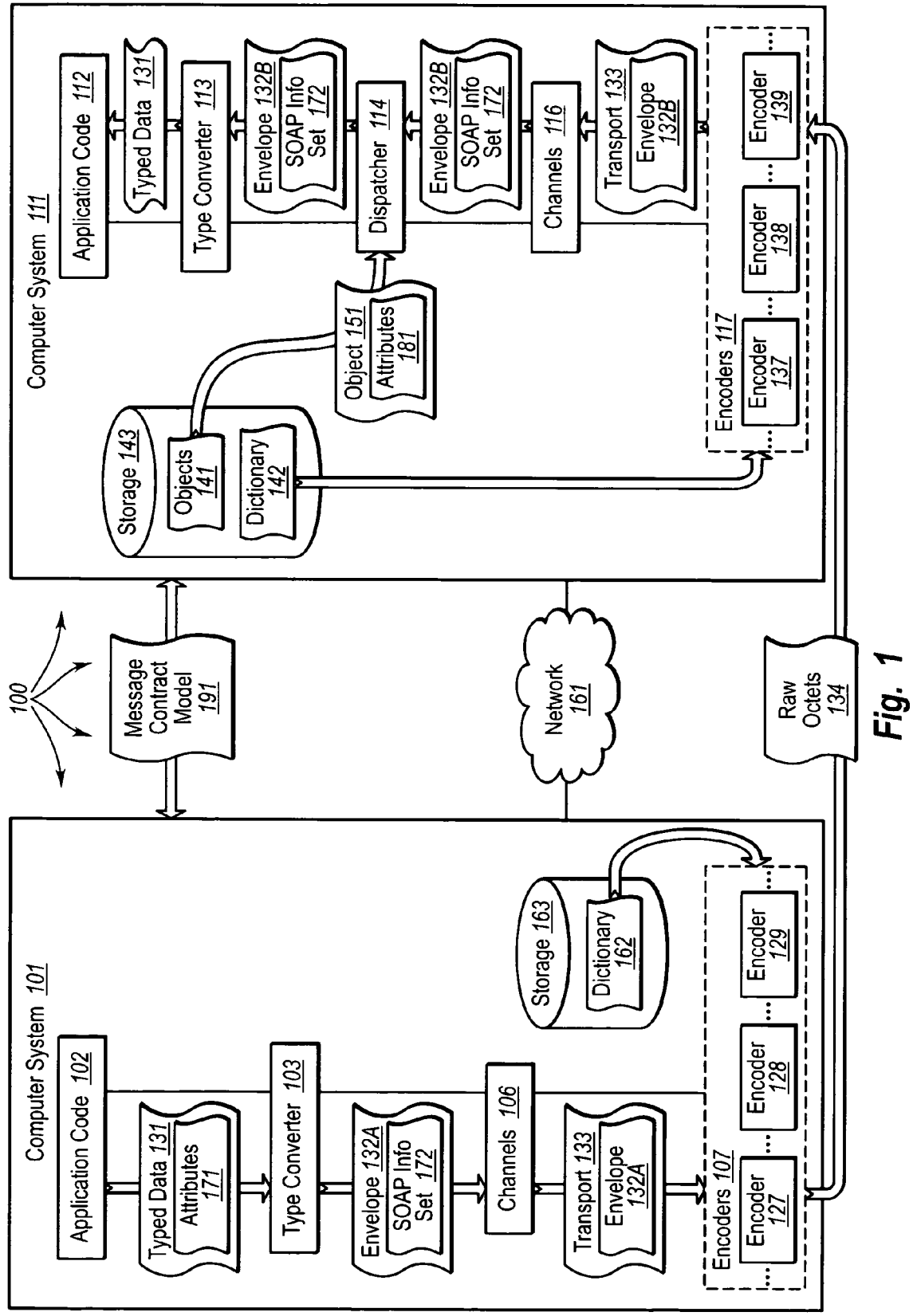
FIG. 1 illustrates an example of a computer architecture that facilitates using Simple Object Access Protocol to exchanged typed objects.

The foregoing problems with the prior state of the art are overcome by the principles of the present invention, which are directed towards methods, systems, and computer program products for flexibly transferring typed application data. In some embodiments, a computer system configures a SOAP message to transmit typed data. Application code (e.g., a client proxy) calls a typed object (e.g., a method) with typed object parameters (e.g., parameters to a method invocation). The computer system accesses the typed object parameters corresponding to the typed object. The typed object is annotated with one or more message contract attributes of a message contract model. The one or more message contract attributes define a mapping between typed object parameters and corresponding SOAP elements.

The computer system maps the accessed typed object parameters into a SOAP elements in accordance with the one or more message contract attributes. The computer system refers to the one or more message contract attributes to identify a location (e.g., a message header or message body) within a SOAP envelope. The computer system inserts the SOAP element into the identified location within the SOAP envelope. The SOAP envelope can then be placed in a channel, encoded into corresponding raw octets, and the corresponding raw octets transferred to another computer system.

In other embodiments, a computer system retrieves typed data from a SOAP message. The computer system can receive raw octets from another computer system, decode the raw octets into a corresponding SOAP envelope, and place the SOAP envelope in a channel. The computer system accesses a SOAP element included in the SOAP envelope.

The computer system identifies a typed object that corresponds to the SOAP element. The typed object is annotated with one or more message contract attributes of a message contract model. The one or more message contract attributes define a mapping between SOAP elements and corresponding typed object parameters. The computer system maps the accessed SOAP element into typed object parameters in accordance with the one or more message contract attributes. The typed object parameters are submitted to application code (e.g., a service) that includes the identified typed object.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

In this description and in the following claims, an "object" is defined as any item that can be individually selected and manipulated. Object is defined to include software objects, such as, for example, methods and other software objects, that include data and procedures to manipulate the data. Object is also defined to include parameters and return values (e.g., method parameters and method return values) that can be exchanged between (e.g., provided as input to or output from) software objects.

In this description and in the following claims, a "message contract" is defined as a contract, such as, for example, a declarative programming model, describing a Simple Object Access Protocol ("SOAP") format. A message contract can be based on Common Language Runtime ("CLR") attributes that define the action, headers, and body portions of a SOAP envelope. Attributes can be used on a type to control the manner in which SOAP envelopes are constructed from, for example, methods, method parameters, and method return values. Fields and/or properties to be included in a message contact can be annotated with, for example, [MessageHeader] or [MessageBody].

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

As depicted in computer architecture 100 computer systems 101 and 111 are connected to network 161. Network 161 can be a Local Area Network ("LAN"), Wide Area Network ("WAN"), or even the Internet. Computer systems connected to network 161 can receive data from and send data to other computer systems connected to network 161. Accordingly, computer systems 101 and 111, as well as other connected computer systems (not shown), can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over network 101. For example, computer systems 101 and 111 can create SOAP envelopes and exchange SOAP envelopes over network 161.

Computer system 101 includes application code 102, type converter 103, channels 106, encoders 107, and storage 163. Application code 102 can be a portion of a distributed application, such as, for example, a client proxy corresponding to application code 112. Application code 102 can be code that was developed in accordance with a method or object-oriented programming model. Thus, data exchanged between modules of application code 102, between modules of application code 102 and modules of application code 112, and between modules of application code 102 and other application code (e.g., a different portion of the distributed application) can be typed data, such as, for example, logical, Boolean, binary, octal, decimal, hexadecimal, integer, floating-point, character, character string, user-defined data types, and combinations of these data types used to defined data structures.

Type converter 103 is configured to convert (or serialize) typed data corresponding to a typed object, such as, for example, parameters to a method invocation, into a corresponding SOAP element and to convert (or deserialize) SOAP elements into corresponding type data corresponding to a typed object. Typed objects, for example, methods included in application code 102 (e.g., of a class), can be annotated with one or more message contract attributes (e.g., Common Language Runtime ("CLR") attributes) of a message contract model, such as, for example, message contract model 191. Type converter 103 can process message contract attributes to map typed data for a typed object to a corresponding SOAP element, such as, for example, to eXtensible Markup Language ("XML") instructions. In some embodiments, type converter 103 is a runtime component configured to convert parameters to a CLR method into one or more SOAP elements and to convert a SOAP element into parameters to a CLR method in accordance with a message contract model. Accordingly, type converter 103 can utilize message contract model 191 to convert a typed CLR object into a CLR representation of a SOAP element and to convert a CLR representation of a SOAP element into a typed CLR object.

Channels 106 provide I/O abstraction for sending and receiving SOAP envelopes. Channels 106 can provide abstractions for using any of a variety of transport protocol schemes (including HTTP, TCP, and User Datagram Protocol ("UDP")), interface schemes, and addressing schemes. Generally, a channel can also be referred to as a connection.

Encoders 107 include one or more encoders for encoding a SOAP element into raw octets and for decoding raw octets into a SOAP element Thus, although encoders 107 are referenced as encoders, encoders 107 are also configured to decode. In computer architecture 100, encoder 107 includes encoders 127, 128, and 129. Each of the encoders 127, 128, and 129 can be configured to encode/decode differently. For example, encoder 127 can be configure to support SOAP over text XML, encoder 128 can be configured to support SOAP over binary XML, and encoder 129 can be configured to support Message-Transmisson Optimization Mechanisms (MTOM). Encoders can also embody compression schemes, including but not limited to generic compression schemes like LZ or GZIP, which are layered encoders (encoders built upon other more primitive encoders).

Text-based encoding provides a mechanism to increase interoperability between distributed applications. For example, text-based encoding can support, UTF8, UTF16 Big-Endian, and UTF16 Little-Endian character sets. Text-based encoding can support various ContentTypes, such as, for example, "text/xml" and "application/soap+xml" (e.g., corresponding to either SOAP 1.1 or SOAP 1.2).

Binary XML encoding provides a mechanism for encoding XML in a binary representation can be more compact and efficient to parse. Binary-based encoding can support ContentTypes, such as, for example, "application/soap+msbin1" and "application/soap+msbinsession1".

MTOM encoding provides a mechanism to efficiently encode binary XML elements within the context of a SOAP envelope. MTOM represents a SOAP envelope as a part (e.g., one of many parts) of a multipart MIME container. The location of the SOAP envelope can be varied to cause either the sender or receiver to buffer any corresponding attachments. For example, a MIME container having a SOAP envelope as the first element (e.g., a first of one or more parts) can cause the writer to buffer any subsequent corresponding attachments. On the other hand, a MIME container having a SOAP as the last element (e.g., a last of one or more parts) can cause the reader to buffer any prior corresponding attachments.

MTOM logically includes the binary attachments within the SOAP envelope. MTOM is polymorphic with other message encoders and no changes to an end-user programming model are needed. Further, MTOM facilitates that attachment of binary data its native format (unencoded) thereby conserving space with a SOAP message (as compared to encoded formats) and freeing up resources that would otherwise be used to implement (potentially computationally expensive) encoding algorithms.

Storage 163 can be a remote or local mass storage device, such as, for example, a magnetic hard drive. Storage 163 stores dictionary 162. Dictionary 162 can contain one or more SOAP and/or XML terms and corresponding reduced length substitute terms. For example, dictionary 162 can store the value "1" as a substitution for "Envelope" or "http://www.w3.org/2003/05/soap-envelope". Accordingly, substitution can be utilized to reduce the size of SOAP envelopes before encoding for transport over network 161.

Dictionary 162 can include a static dictionary portion and a dynamic dictionary portion. The static portion of dictionary 162 can include SOAP and/or XML terms that have a higher degree of commonality between different and diverse applications. For example, there is a high degree of likelihood that many different applications (independent of functionality) will use the terms "Envelope" and "http://www.w3.org/2003/05/soap-envelope". Thus, these terms can be included in the static portion of dictionary 162.

The dynamic portion of dictionary 162 can include SOAP and/or XML terms that are common between a smaller plurality of applications but that are not necessarily common between all applications or a larger plurality of applications. For example, terms common to banking applications can be included in a dynamic portion of dictionaries at computer systems that utilize banking applications. However, banking terms may not be included in dynamic portions of dictionaries at computer systems that do not use banking applications. Terms can be included in the dynamic portion of a dictionary when the terms are identified as being common between applications. From time to time (e.g., when a period of non-use expires), terms can be removed from the dynamic portion of a dictionary. Dynamic dictionary terms differ from static dictionary terms in that dynamic dictionary terms can be incrementally transmitted on a connection along with the first message sent on that connection that references them. This tokenization can be limited in scope to parts of the message which are likely to repeat, such as the XML names and namespaces related to a particular typed data structure or method, parameter, or return value.

Computer system 111 includes application code 112, type converter 113, channels 116, encoders 117, and storage 143. Application code 112 can be a portion of a distributed application, such as, for example, a service corresponding to application code 102. Application code 112 can be code that was developed in accordance with a method or object-oriented programming model. Thus, data exchanged between modules of application code 112, between modules of application code 112 and modules of application code 102, and between modules of application code 112 and other application code (e.g., a different portion of the distributed application) can be typed data, such as, for example, logical, binary, octal, decimal, hexadecimal, integer, floating-point, character, character string, user-defined data types, and combinations of these data types used to defined data structures.

Type converter 113 is configured to convert (or serialize) typed data corresponding to a typed object, such as, for example, parameters to a method invocation, into a corresponding SOAP element and to convert (or deserialize) SOAP elements into corresponding type data corresponding to a typed object. Typed objects, for example, methods included in application code 112 (e.g., of a public sealed class), can be annotated with one or more message contract attributes (e.g., Common Language Runtime ("CLR") attributes) of a message contract model, such as, for example, message contract model 191. Type converter 113 can process message contract attributes to map typed data for a typed object to a corresponding SOAP element, such as, for example, into XML elements. In some embodiments, type converter 113 is a runtime component configured to convert parameters to a CLR method into a SOAP element and to convert a SOAP element into parameters to a CLR method in accordance with a message contract model. Accordingly, type converter 113 can utilize message contract model 191 to convert a typed CLR object into a CLR representation of a SOAP element and to convert a CLR representation of a SOAP element into a typed CLR object.

Dispatcher 114 receives SOAP elements (e.g., from an appropriate channel) and dispatches SOAP elements to the appropriate typed object (e.g., method). When dispatcher 114 receives a SOAP element, dispatcher 114 attempts to match the SOAP element to an appropriate typed object. In some embodiments, dispatcher 114 attempts to match portions of XML elements (in a SOAP element) to an appropriate typed object. Dispatcher 114 can compare portions of XML elements to message contract attributes that annotate objects in objects 141. When a match is identified, dispatcher 114 dispatches the SOAP element to the matching object. Messages can be dispatched on the value of an Action property of a message contract attribute that annotates the matching object. When no match is identified, dispatcher 114 can dispatch the SOAP element to a default object.

Channels 116 provide I/O abstraction for sending and receiving SOAP envelopes. Channels 116 can provide abstractions for using any of a variety of transport protocol schemes (including HTTP, TCP, and User Datagram Protocol ("UDP")), interface schemes, and addressing schemes. Channels 116 can provide abstraction for transport protocol schemes, interface schemes, and addressing schemes that are also provided at channels 106.

Encoders 117 include one or more encoders for encoding a SOAP element into raw octets and for decoding raw octets into a SOAP element. Thus, although encoders 117 are referenced as encoders, encoders 117 are also configured to decode. In computer architecture 100, encoder 117 includes encoders 137, 138, and 139. Each of the encoders 137, 138, and 139 can be configured to encode/decode differently. For example, encoder 137 can be configure to support SOAP over text XML, encoder 138 can be configured to support SOAP over binary XML, and encoder 139 can be configured to support Message-Transmission Optimization Mechanisms (MTOM).

Storage 143 can be a remote or local mass storage device, such as, for example, a magnetic hard drive. Storage 143 stores dictionary 162 and objects 141. Dictionary 162 can contain one or more SOAP and/or XML terms and corresponding substations that are of reduced length. For example, dictionary 162 can store the value "2" as a substitution for "wsa". Accordingly, substitution can be utilized to reduce the size of SOAP envelopes before encoding for transport over network 161.

Figure 2:
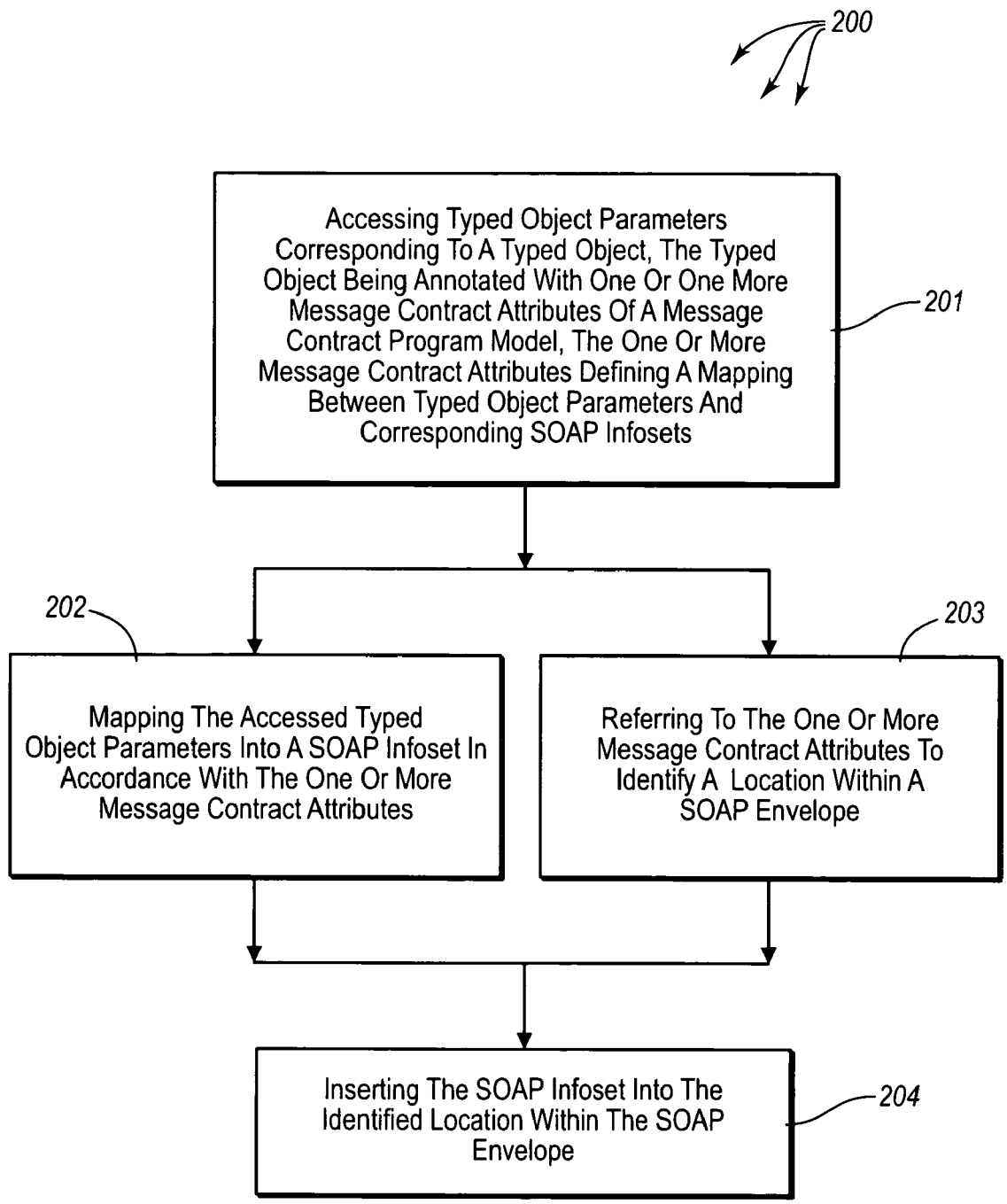
FIG. 2 illustrates an example flow chart of a method of flexibly sending typed application data.

Dictionary 142 can include a static dictionary portion and a dynamic dictionary portion. The static portion can include SOAP and/or XML terms that have a higher degree of commonality between different and diverse applications The dynamic portion of dictionary 162 can include SOAP and/or XML terms that are common between a smaller plurality of applications but that are not necessarily common between all applications or a larger plurality of applications FIG. 2 illustrates an example flow chart of a method 200 of flexibly sending typed application data. The method 200 will be described with respect to the modules and data in computer architecture 100.

Application code 102 can generate typed data 131 that is, for example, included in a typed message. The typed message can be configured in accordance with message contract model 191 for representing a SOAP envelope as a typed (CLR) object. Typed data 131 can include parameters and/or a return value for a method. For example, application code 102 can call a method with parameters that cause a method to be invoked.

Method 200 includes an act of accessing typed object parameters corresponding to a typed object (act 201). For example, type converter 103 can access typed data 131. Typed data 131 can include parameters that correspond to a typed object (e.g., parameters for invoking a method). The typed object can be annotated with one or more message contract attributes of message contract model 191, such as, for example, attributes 171. Accordingly, attributes 171 define a mapping between typed data 131 and a corresponding SOAP element (e.g., SOAP element 172).

Method 200 includes an act of mapping the accessed typed object parameters into an SOAP element in accordance with the one or more message contract attributes (act 202). For example, type converter 103 can map typed data 131 (e.g., parameters for invoking a method) into SOAP element 172 (e.g., XML elements) in accordance with attributes 171.

Method 200 includes an act of referring to the one or more message contract attributes to identify a location within a SOAP envelope (act 203). For example, type converter 103 can refer to attributes 171 to identify a location within envelope 132A (created at computer system 101). Attributes 171 can identify, for example, a message header or message body within envelope 132A. Further attributes 171 can identify specified positions within a message header or a message body. Thus, corresponding SOAP elements can be ordered within a message header or within a message body.

Method 200 includes an act inserting the SOAP element into the identified location within the SOAP envelope (act 204). For example, type converter 103 can insert SOAP element 172 into (e.g., a specified position of) a header portion or body portion of envelope 132A. Envelope 132A can be transferred through a channel from among channels 106, for example, in accordance with a selected transport, interface, and addressing scheme. For example, envelope 132A can be encapsulated in transport 133.

An encoder from encoders 107, such as, for example, encoder 128 can encode the encapsulated enveloped 132A into raw octets 134. When appropriate, encoder 128 refers to dictionary 162 to substitute for commonly used terms. Computer system 101 sends raw octets 134, via network 161, to computer system 111. Computer system 111 receives raw octets 134, via network 161, from computer system 101.

Figure 3:
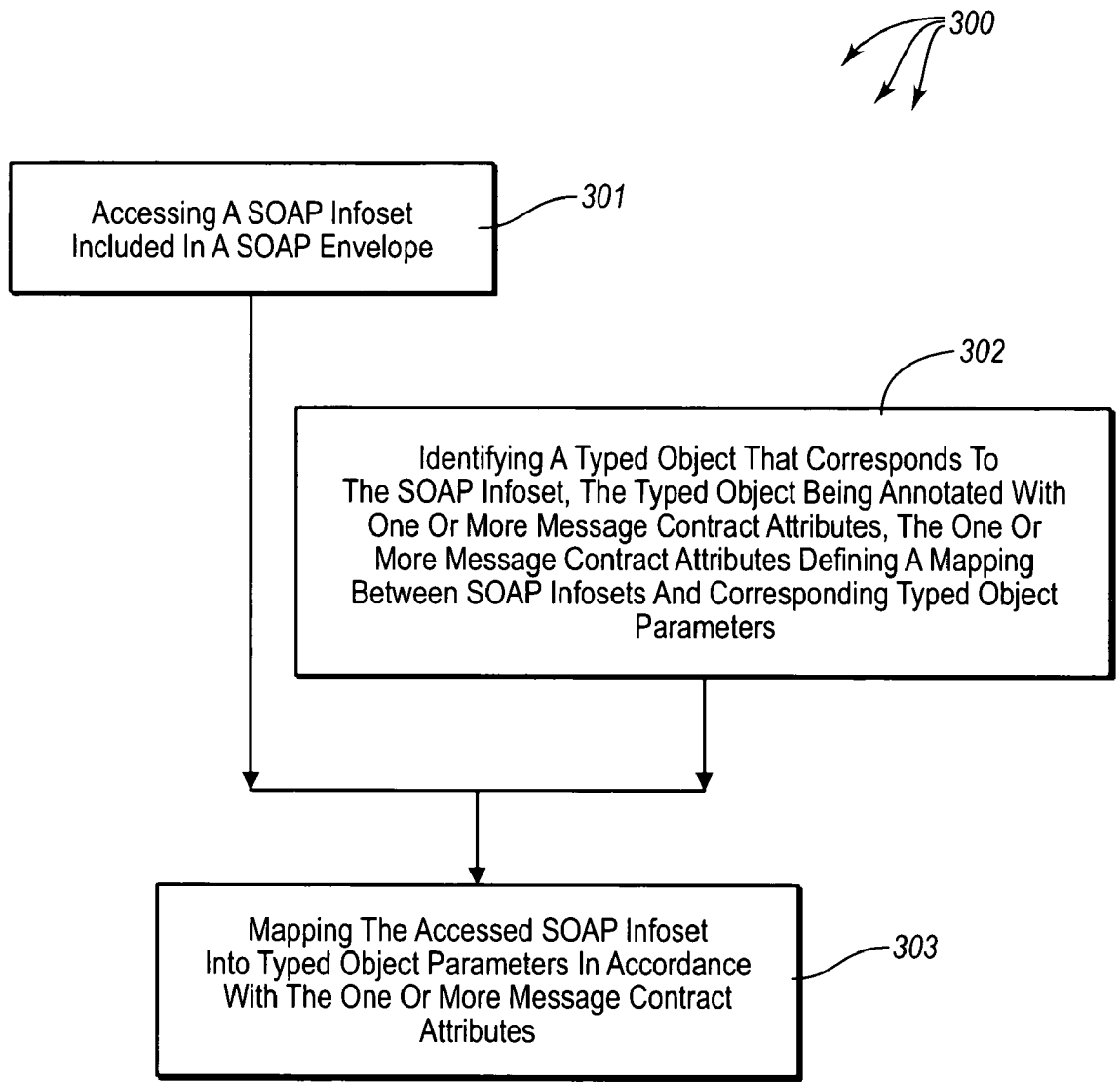
FIG. 3 illustrates an example flow chart of a method of flexibly receiving typed application data.

FIG. 3 illustrates an example flow chart of a method 300 for flexibly receiving typed application data. The method 300 will be described with respect to the modules and data in computer architecture 100.

An encoder from encoders 117, such as, for example, encoder 138 can receive raw octets 134. Encoder 138 can decode raw octets 134 to reveal envelope 132B. When appropriate, encoder 138 refers to dictionary 142 to replace terms that were substituted prior to encoding. Decoding raw octets 134, can reveal that envelope 132B was transferred, for example, in accordance with a selected transport, interface, and addressing scheme. For example, decoding raw octets 134 can reveal that envelope 132B is encapsulated in transport 133.

Based on the transport, interfaces, and/or addressing scheme, encapsulated envelope 132B can be transferred through an appropriate channel. Since it is possible for intermediaries in network 161 to alter portions of data in envelope 132A (e.g., routing headers) during transfer, envelope 132A and envelope 132B may include different data. Dispatcher 114 receives envelope 132B including SOAP element 172

Method 300 includes an act accessing a SOAP element included in a SOAP envelope (act 301). For example, dispatcher 114 can access SOAP element 172.

Method 300 includes an act of identifying a typed object that corresponds to the SOAP element (act 302). For example, dispatcher 114 can identify object 151 from objects 141 (e.g., a collection of objects included in various distributed application components at computer system 111). Object 151 can be a typed object (e.g., a method of application code 112) that is annotated with attributes 181 of message contract model 191. Attributes 181 can define a mapping between SOAP element 172 and corresponding typed object parameters (e.g., parameters for invoking a method). Dispatcher 114 can match portions of SOAP element 172 (e.g., portions of XML elements) with attributes 181 to identify that SOAP element 172 corresponds to object 151. In some embodiments, this includes utilizing a URI (e.g., a WS-Addressing Action URI) to map SOAP element 172 to object 151.

The method 300 includes an act of mapping the accessed SOAP element into typed object parameters in accordance with the one or more message contract attributes (act 303). For example, type converter 113 can map SOAP element 172 to a typed message that includes typed data 131 (in accordance with attributes 181). The typed message can be configured in accordance with message contract model 191 for representing a SOAP envelope as a typed (CLR) object. Typed data 131 can include parameters and/or a return value for a method. For example, application code 112 can receive a method call (initiated at application 102) with parameters that cause the method to be invoked.

Thus, embodiments of the present invention enable a developer to control the manner in which method parameters and return values are serialized to message headers and message bodies. Likewise, a developer can control the manner in which method parameters and return values are deserialized from message headers and message bodies. Accordingly, developed applications can retain both the benefits of typed data (e.g., CLR typed objects)<and the flexibility of SOAP messaging.

The following example code instructions depict an annotated class wherein the properties and fields of the annotated class with are annotated with message contract attributes:

Line 1: [MessageContract(Action="http://createpersonrequest", Name="CreatePersonRequest")]
Line 2: public class CreatePersonRequest {
Line 3: [MessageBody(Namespace="http://namespace", Name="MyData", Position=2)]
Line 4: public string OptionalData;
Line 5: [MessageBody(Namespaceuri="http://namespace", Name="TheList")]
Line 6: Public Ilist<int> Ids;
Line 7: [MessageHeader(Namespaceuri="http://namespace", Name="Request")]
Line 8: internal Guid RequestId;
Line 9: [MessageHeader(Namespaceuri="http://namespace", Name="Session", MustUnderstand=true, Relay=false, Actor=http://actor)]
Line 10: internal Guid SessionId;

The [MessageContract] attribute at Line 1 annotates the public class CreatePersonRequest at Line 2 and defines a message contract "CreatePersonRequest" (e.g., message contract model 191), for controlling the processing and creating of SOAP envelopes. Lines 3 and 5 annotate lines 4 and 6 respectively with [MessageBody] indicating inclusion in a body of a SOAP envelope. Lines 7 and 8 annotate lines 9 and 10 respectively with [MessageHeader] indicating inclusion in a header of a SOAP envelope. The "Position=2" attribute on line 3 indicates that the annotated typed data is to be included as the second element in a message body.

A type converter, such as, for example, type converter 103 or type converter 113, can utilize a message contract model, such as, for example, message contract model 191, to convert the example code instructions into the following example SOAP envelope:

```
<soap:Envelope>
    xmlns:soap="http://schemas.xmlsoap.org/soap/envelope/"
    xmlns:wsa="http://schemas.xmlsoap.org/ws/2004/03/addressing"
        <soap:Header xmlns:x="http://namespace">
            <x:Request>xc6gf83</x:Request>
            <x:Session MustUnderstand = "true", Relay= "false",
            Actor = "http://actor">
                    gg57hjfg
                </x:Session>
            <wsa:Action>http://createpersonrequest</wsa:Action>
        </soap:Header>
        <soap:Body xmlns:x='http://namespace'>
                    <x:TheList>
                        <x:Item>5</x:Item>
                        <x:Item>10</x:Item>
                    </x:TheList>
                    <x:MyData>some data here</x:MyData>
        </soap:Body>
</soap:Envelope>
```

A type converter, such as, for example, type converter 103 or type converter 113, can also utilize a message contract model, such as, for example, message contract model 191, to convert example SOAP envelope into the examples code instructions. In the example SOAP envelope, the "MyData" element is in the second position within the SOAP envelope body.

In some embodiments of the present invention, transport streaming is utilized to compensate for larger messages that cannot be fully represented in memory at one moment in time. That is, transport streaming is advantageous for messages that are larger than the memory (e.g., due to physical or allocated memory limitations) available to a service processing the message. Transport streaming can include a dedicated transport connection (TCP socket, named pipe, HTTP connection, etc.) to stream the message. Computer systems that are to use transport streaming can be configured in accordance with a Transfer Mode property of an appropriate transport factory (e.g., TcpChannelFactory/TcpListenerFactory, NamedPipeChannelFactory/NamedPipeListenerFactory, and HttpChannelFactory/HttpListenerFactory).

Transport streaming can be enabled via corresponding transport binding elements (e.g., TransportBindingElement, NamedPipeTransportBindingElement and HttpTransportBindingElement) used to annotate a typed object. Transport properties can be varied based on the channel type. For example, for TCP or NamedPipe, IOutputChannel/IInputChannel or IDuplexSessionChannel (which uses a pair of IOutputChannel/InputChannels) can be used. For HTTP, IRequestChannel/IReplyChannel, IRequestSessionChannel/ IReplySessionChannel, IOutputChannel/IInputChannel or IFullDuplexChannel can be used. When streaming is configured for a given data contract, an appropriate channel (e.g., in channels 106 and/or 116) can facilitate requesting and creating a proper channel type.

Transport streaming is transparent to the reader of the message. That is, the application does not need to write itself differently in order to deal with the message. The application can simply read the values sequentially using a common XML element API (e.g., XmlReader). A transport binding element can be configured by instantiating the transport binding element and assigning a value to property on that element. Transport binding elements can also be configured via CLR configuration (e.g., a myapp.config file).

FIG. 4 illustrates a suitable operating environment for the principles of the present invention. FIG. 4 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 4, an example system for implementing the invention includes a general-purpose computing device in the form of computer system 420, including a processing unit 421, a system memory 422, and a system bus 423 that couples various system components including the system memory 422 to the processing unit 421. Processing unit 421 can execute computer-executable instructions designed to implement features of computer system 420, including features of the present invention. The system bus 423 may be any of several types of bus structures including a memory bus or memory controller, a peripheral bus, and a local bus using any of a variety of bus architectures. The system memory includes read only memory ("ROM") 424 and random access memory ("RAM") 425. A basic input/output system ("BIOS") 426, containing the basic routines that help transfer information between elements within computer system 420, such as during start-up, may be stored in ROM 424.

The computer system 420 may also include magnetic hard disk drive 427 for reading from and writing to magnetic hard disk 439, magnetic disk drive 428 for reading from or writing to removable magnetic disk 429, and optical disk drive 430 for reading from or writing to removable optical disk 431, such as, or example, a CD-ROM or other optical media. The magnetic hard disk drive 427, magnetic disk drive 428, and optical disk drive 430 are connected to the system bus 423 by hard disk drive interface 432, magnetic disk drive-interface 433, and optical drive interface 434, respectively. The drives and their associated computer-readable media provide non-volatile storage of computer-executable instructions, data structures, program modules, and other data for the computer system 420. Although the example environment described herein employs magnetic hard disk 439, removable magnetic disk 429 and removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 439, magnetic disk 429, optical disk 431, ROM 424 or RAM 425, including an operating system 435, one or more application programs 436, other program modules 437, and program data 438. A user may enter commands and information into computer system 420 through keyboard 440, pointing device 442, or other input devices (not shown), such as, for example, a microphone, joy stick, game pad, scanner, or the like. These and other input devices can be connected to the processing unit 421 through input/output interface 446 coupled to system bus 423. Input/output interface 446 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 447 or other display device is also connected to system bus 423 via video interface 448. Other peripheral output devices (not shown), such as, for example, speakers and printers, can also be connected to computer system 420.

Computer system 420 is connectable to networks, such as, for example, an office-wide or enterprise-wide computer network, a home network, an intranet, and/or the Internet. Computer system 420 can exchange data with external sources, such as, for example, remote computer systems, remote applications, and/or remote databases over such networks.

Computer system 420 includes network interface 453, through which computer system 420 receives data from external sources and/or transmits data to external sources. As depicted in FIG. 4, network interface 453 facilitates the exchange of data with remote computer system 483 via link 451. Network interface 453 can logically represent one or more software and/or hardware modules, such as, for example, a network interface card and corresponding Network Driver Interface Specification ("NDIS") stack. Link 451 represents a portion of a network (e.g., an Ethernet segment), and remote computer system 483 represents a node of the network.

Likewise, computer system 420 includes input/output interface 446, through which computer system 420 receives data from external sources and/or transmits data to external sources. Input/output interface 446 is coupled to modem 454 (e.g., a standard modem, a cable modem, or digital subscriber line ("DSL") modem) via link 459, through which computer system 420 receives data from and/or transmits data to external sources. As depicted in FIG. 4, input/output interface 446 and modem 454 facilitate the exchange of data with remote computer system 493 via link 452. Link 452 represents a portion of a network and remote computer system 493 represents a node of the network.

While FIG. 4 represents a suitable operating environment for the present invention, the principles of the present invention may be employed in any system that is capable of, with suitable modification if necessary, implementing the principles of the present invention. The environment illustrated in FIG. 4 is illustrative only and by no means represents even a small portion of the wide variety of environments in which the principles of the present invention may be implemented.

In accordance with the present invention, modules including application code, client proxies, services, type converters, channels, message encoder/decoders, and dispatchers as well as associated data, including typed data, SOAP envelopes, transports, raw octets, dictionaries, and objects, may be stored and accessed from any of the computer-readable media associated with computer system 420. For example, portions of such modules and portions of associated program data may be included in operating system 435, application programs 436, program modules 437 and/or program data 438, for storage in system memory 422.

When a mass storage device, such as, for example, magnetic hard disk 439, is coupled to computer system 420, such modules and associated program data may also be stored in the mass storage device. In a networked environment, program modules depicted relative to computer system 420, or portions thereof, can be stored in remote memory storage devices, such as, system memory and/or mass storage devices associated with remote computer system 483 and/or remote computer system 493. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired secured by United States Letters Patent is:

1. A first computer system, comprising:
   at least one processing unit; and
   at least one system memory communicatively coupled to the at least one processing unit and comprising computer-readable instructions that when executed by the at least one processing unit perform a method of converting typed application data into a Simple Object Access Protocol (SOAP) format, the method comprising:
   an act of storing by the first computer system a typed data object, wherein the typed data object defines a method associated with a first portion of a distributed application, wherein the typed data object comprises:
      typed application data comprising at least one typed object parameter for invoking the method, wherein the at least one typed object parameter is in a format compatible with the first portion of the distributed application and with a second portion of the distributed application on a second computer system; and
      at least one message contract attribute of a message contract model, wherein the at least one message contract attribute annotates the typed data object such that the at least one message contract attribute is adjacent to the at least one typed object parameter, wherein the at least one message contract attribute defines a mapping between the at least one typed object parameter and a corresponding SOAP element, and wherein the at least one message contract attribute specifies a location within a SOAP envelope for inserting the corresponding SOAP element;
   an act of accessing the typed data object;
   an act of mapping the at least one typed object parameter to the corresponding SOAP element by referring to the at least one message contract attribute that annotates the accessed typed data object;
   an act of inserting the corresponding SOAP element into the location within the SOAP envelope in accordance with the at least one message contract attribute; and
   an act of transmitting the SOAP envelope to the second portion of the distributed application on the second computer system.

2. The first computer system as recited in claim 1, wherein the act of accessing the typed data object comprises an act of accessing a class that represents parameters to the method.

3. The first computer system as recited in claim 2, wherein the act of accessing the class that represents parameters to the method comprises an act of accessing a public class that represents parameters to a Common Language Runtime method.

4. The first computer system as recited in claim 1, wherein the typed data object is annotated with an Action URI.

5. The first computer system as recited in claim 1, wherein the act of accessing the typed data object comprises an act of accessing a class that represents a method return value.

6. The first computer system as recited in claim 1, wherein the act of accessing the typed data object comprises an act of accessing a Common Language Runtime representation of a SOAP element.

7. The first computer system as recited in claim 1, wherein the act of accessing the typed data object comprises an act of accessing a typed message.

8. The first computer system as recited in claim 1, wherein the act of accessing the typed data object comprises an act of accessing the typed object parameter that is annotated with the at least one message contract attribute, wherein the at least one message contract attribute indicates that an XML representation of the typed object parameter is to be included in a SOAP envelope header.

9. The first computer system as recited in claim 1, wherein the act of accessing the typed data object comprises an act of accessing the typed object parameter that is annotated with the at least one message contract attribute, wherein the at least one message contract attribute indicates that an XML representation of the typed object parameter is to be included in a SOAP envelope body.

10. The first computer system as recited in claim 1, wherein the act of accessing the typed data object comprises an act of accessing one or more typed object parameters that are annotated with one or more message contract attributes, the one or more message contract attributes being selected from among attributes that indicate a position within a SOAP envelope, a name, a namespace URI, whether a typed object parameter must be understood, whether a typed object parameter can be relayed, and an actor for the a typed object parameter.

11. The first computer system as recited in claim 1, wherein the act of mapping the typed object parameter into the corresponding SOAP element in accordance with the at least one message contract attribute comprises an act of serializing the typed object parameter to the corresponding SOAP element.

12. The first computer system as recited in claim 1, wherein the act of mapping the typed object parameter into the corresponding SOAP element in accordance with the at least one message contract attribute comprises an act of mapping typed object parameter into a corresponding XML element.

13. The first computer system as recited in claim 1, wherein the act of inserting the corresponding SOAP element into the location within the SOAP envelope comprises an act of inserting the corresponding SOAP element into a header portion of the SOAP envelope in accordance with the at least one message contract attribute.

14. The first computer system as recited in claim 1, wherein the act of inserting the corresponding SOAP element into the location within the SOAP envelope comprises an act of inserting the corresponding SOAP element into a body portion of a SOAP envelope in accordance with the at least one message contract attribute.

15. The first computer system as recited in claim 1, wherein the act of inserting the corresponding SOAP element into the location within the SOAP envelope comprises an act of inserting corresponding XML instructions into a header portion of the SOAP envelope.

16. The first computer system as recited in claim 1, wherein the act of inserting the corresponding SOAP element into the location within the SOAP envelope comprises an act of inserting corresponding XML elements into a body portion of the SOAP envelope.

17. The first computer system as recited in claim 1, further comprising:
an act of encoding the SOAP envelope into raw octets; and
an act of sending the raw octets to the second computer system.

18. The first computer system as recited in claim 17, wherein the act of encoding the SOAP envelope into raw octets comprises an act of encoding the SOAP envelope into raw octets wherein the size of the raw octets has no predefined limit.

19. The first computer system as recited in claim 17, wherein the act of encoding the SOAP envelope into raw octets comprises an act of generating a text-based encoding of the SOAP envelope.

20. The first computer system as recited in claim 17, wherein the act of encoding the SOAP envelope into raw octets comprises an act of using a Message-Transmission Optimization Mechanism to encode the SOAP envelope.

21. The first computer system as recited in claim 17, wherein the act of encoding the SOAP envelope into raw octets comprises an act of generating a binary-based encoding of the SOAP envelope.

22. The first computer system as recited in claim 21, wherein the act of generating a binary-based encoding of the SOAP envelope comprises an act of substituting one or more SOAP terms or XML terms with substitute terms of reduced length such that the SOAP envelope can be transferred more efficiently.

23. The first computer system as recited in claim 17, wherein the act of sending the raw octets to the other computer system comprises an act of streaming the raw octets to the second computer system.

24. A computer-implemented method for converting typed application data into a Simple Object Access Protocol (SOAP) format, the method comprising:
an act of storing by a first computer system a typed data object, wherein the typed data object defines a method associated with a first portion of a distributed application, wherein the typed data object comprises:
typed application data comprising at least one typed object parameter for invoking the method, wherein the at least one typed object parameter is in a format compatible with the first portion of the distributed application and with a second portion of the distributed application on a second computer system; and
at least one message contract attribute of a message contract model, wherein the at least one message contract attribute annotates the typed data object such that the at least one message contract attribute is adjacent to the at least one typed object parameter, wherein the at least one message contract attribute defines a mapping between the at least one typed object parameter and a corresponding SOAP element, and wherein the at least one message contract attribute specifies a location within a SOAP envelope for inserting the corresponding SOAP element;
an act of accessing the typed data object;
an act of mapping the at least one typed object parameter to the corresponding SOAP element by referring to the at least one message contract attribute that annotates the accessed typed data object;
an act of inserting the corresponding SOAP element into the location within the SOAP envelope in accordance with the at least one message contract attribute; and an act of transmitting the SOAP envelope to the second portion of the distributed application on the second computer system.

25. The computer-implemented method as recited in claim 24, wherein the act of accessing the typed data object comprises accessing a public class that represents parameters to a Common Language Runtime method.

26. The computer-implemented method as recited in claim 24, wherein the act of accessing the typed data object comprises accessing a public class that represents a Common Language Runtime method return value.

27. The computer-implemented method as recited in claim 24, wherein the act of mapping the typed object parameter to the corresponding SOAP element comprises serializing the typed object parameter to the corresponding SOAP element.

28. The computer-implemented method as recited in claim 24, wherein the act of inserting the corresponding SOAP element into the location within the SOAP envelope comprises an act of inserting the corresponding SOAP element into a header portion of the SOAP envelope in accordance with the at least one message contract attribute.

29. The computer-implemented method as recited in claim 24, wherein the act of inserting the corresponding SOAP element into the location within the SOAP envelope comprises an act of inserting the corresponding SOAP element into a body portion of the SOAP envelope in accordance with the at least one message contract attribute.

30. The computer-implemented method as recited in claim 24, wherein the typed data object comprises at least a first typed object parameter that is mapped to a header portion of the SOAP envelope in accordance with a first message contract attribute, and wherein the type data object further comprises at least a second typed object parameter that is mapped to a body portion of the SOAP envelope in accordance with a second message contract attribute.

* * * * *